April 9, 1946.　　　　P. MEEHAN　　　　2,398,188
ANIMAL TRAP
Filed March 19, 1943　　　　4 Sheets-Sheet 1
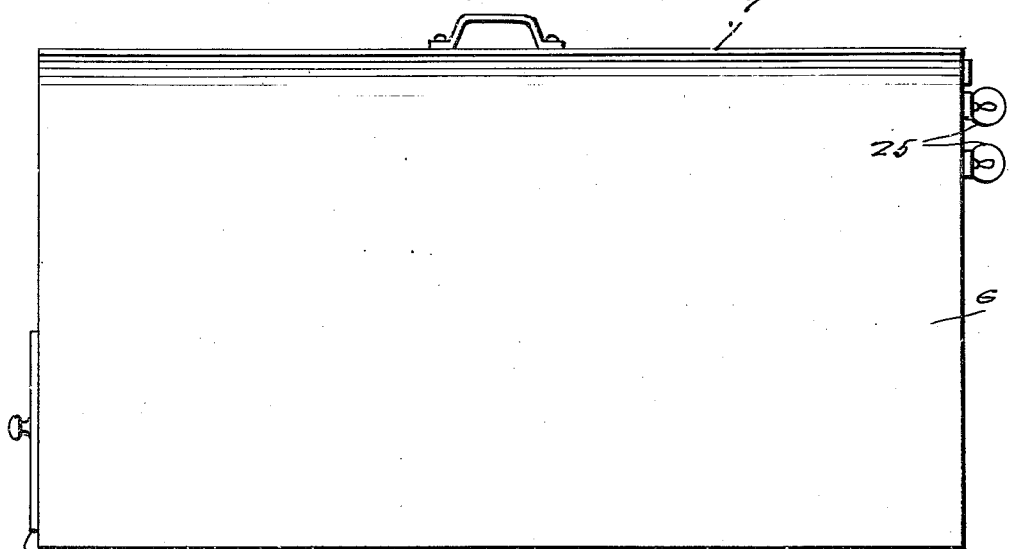
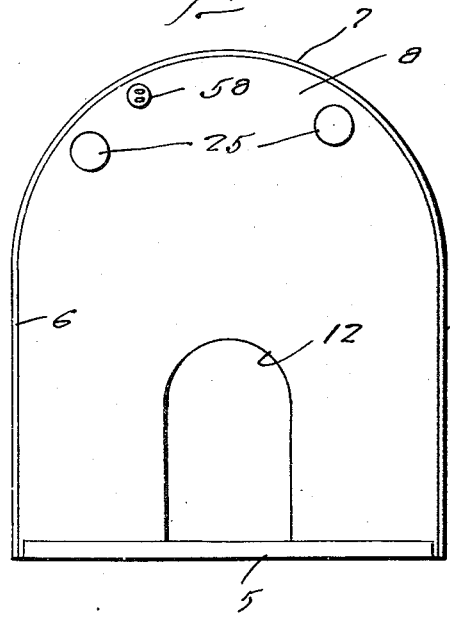
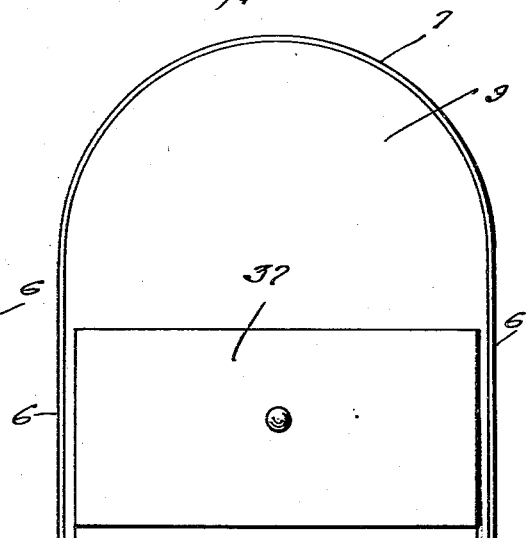
Inventor
Paul Meehan

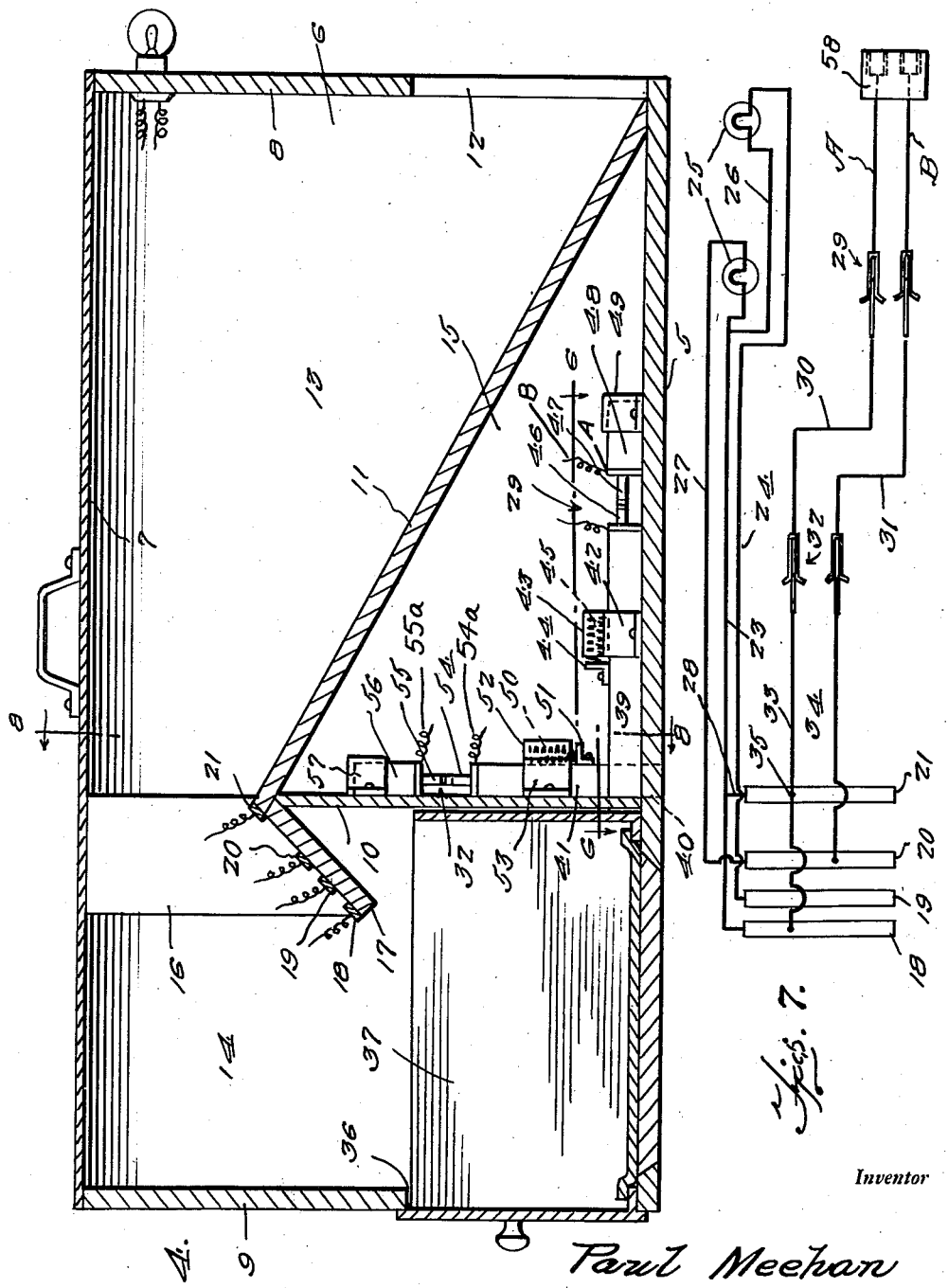

April 9, 1946.　　　　P. MEEHAN　　　　2,398,188
ANIMAL TRAP
Filed March 19, 1943　　　4 Sheets-Sheet 3
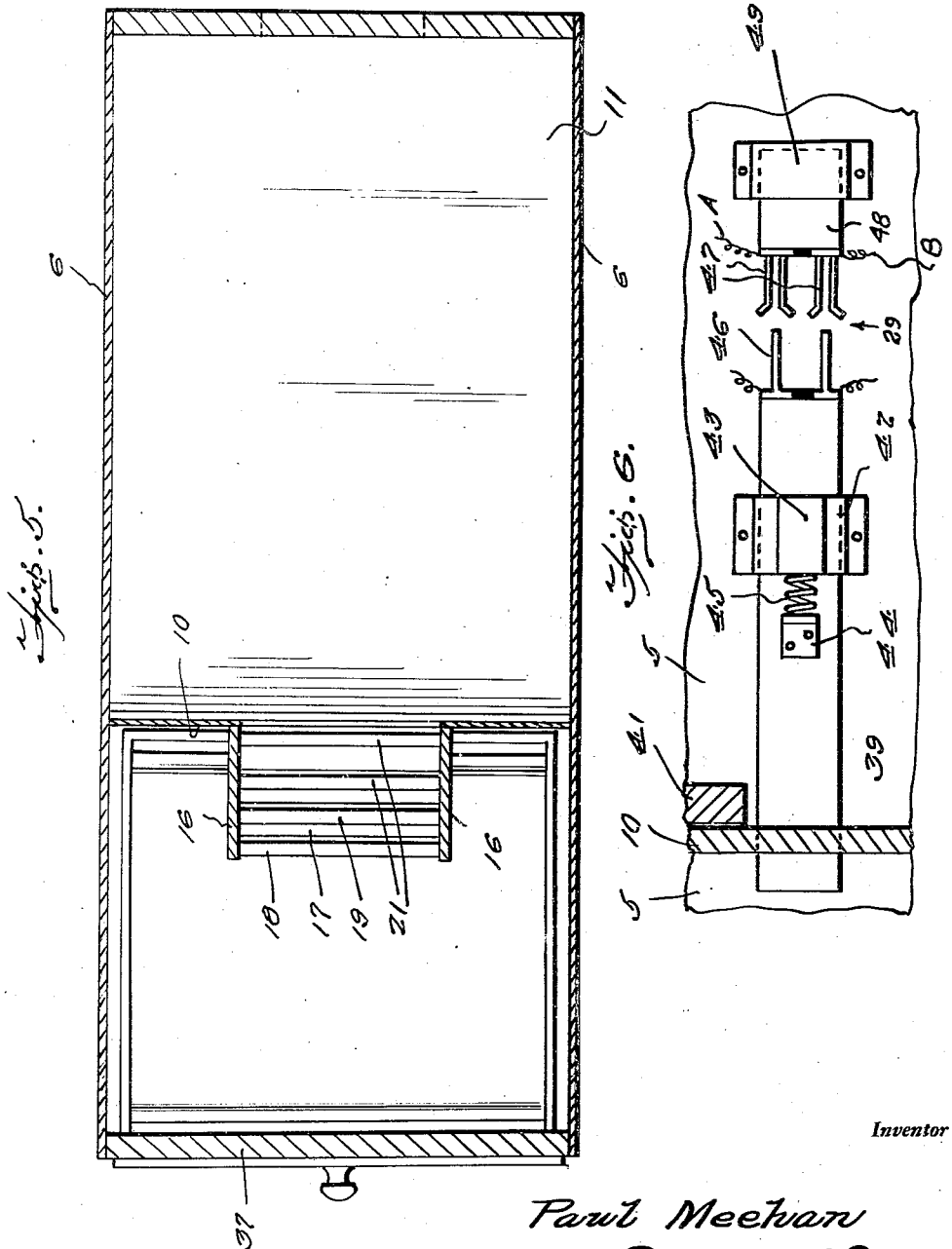
Inventor
Paul Meehan
By Clarence A. O'Brien
and Harvey B. Jacobson
Attorneys April 9, 1946.    P. MEEHAN    2,398,188
ANIMAL TRAP
Filed March 19, 1943    4 Sheets-Sheet 4

Inventor
Paul Meehan
By Clarence A. O'Brien
and Harvey B. Jacobson
Attorneys

Patented Apr. 9, 1946

2,398,188

UNITED STATES PATENT OFFICE 2,398,188

ANIMAL TRAP

Paul Meehan, St. Louis, Mo.

Application March 19, 1943, Serial No. 479,768

3 Claims. (Cl. 43—99)

This invention relates to new and useful improvements in animal trapping and more particularly to a trap in which animals are electrocuted.

The principal object of the present invention is to provide a trap into which animals are readily enticed and therein subjected to a charge of electricity sufficient for the purpose of destroying the creatures.

Still another important object of the invention is to provide an electric trap wherein safeguards are provided against the possibility of a person handling the trap being electrically shocked.

Other important objects and advantages of the invention will become apparent to the reader of the following description.

In the drawings:

Figure 1 is a side elevational view of the trap.

Figure 2 is an end elevational view of the trap looking at the entrance.

Figure 3 is an end elevational view of the trap looking at the collection drawer.

Figure 4 is a longitudinal sectional view through the trap.

Figure 5 is a horizontal sectional view.

Figure 6 is an enlarged horizontal fragmentary sectional view taken substantially on the line 6—6 of Figure 4.

Figure 7 is a diagrammatic view showing the electrical connections between the electrical devices involved.

Figure 8:
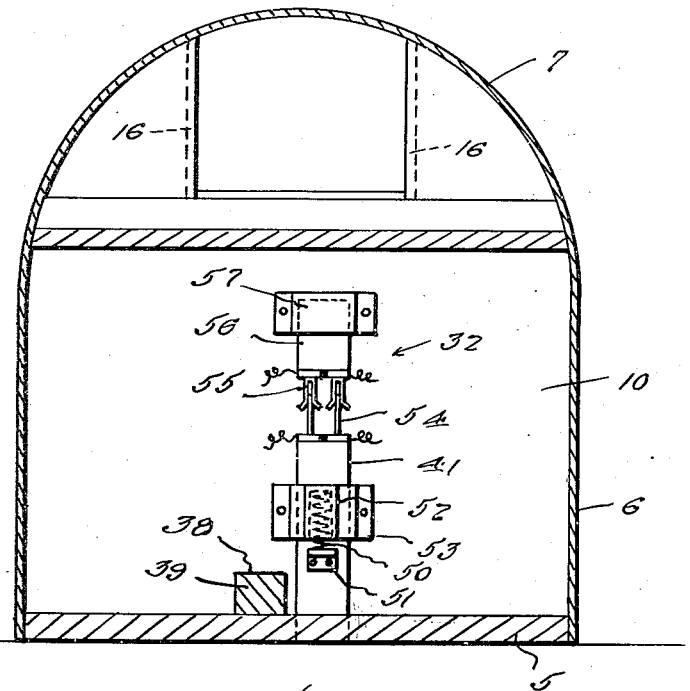
Figure 8 is a vertical sectional view taken substantially on the line 8—8 of Figure 4, showing the trap on the ground or other support.

Referring to the drawings wherein like numerals designate like parts, it can be seen that the trap includes a bottom 5, side walls 6 and an arcuate top 7. The trap further consists of end walls 8, 9.

Toward one side of the central portion of the above enclosure is a vertical transverse partition 10 against which rests the upper end of a ramp 11, the lower portion of which terminates at an entrance opening 12 located in the end wall 8.

The partition 10 divides the interior of the trap into chambers 13, 14 and 15 with the cooperation of the ramp 11.

An inclined chute having vertically disposed side walls 16, is denoted by numeral 17 and has electric conductor strips 18, 19, 20 and 21 disposed transversely thereon, the conductors 18, 19 and 20 being substantially equi-distantly spaced rather close together, while the conductor 21 is comparatively removed from the conductor 20, this for the purpose of electrocuting larger animals.

Extending from the conductors 18 and 19 are wires 23 and 24 each to one side of a corresponding indicating lamp 25. The remaining side of one of these lamps 25 has a jumper 26 connected to the wire 23, while the remaining side of the remaining lamp has a conductor 27 extending to the conductor 20. It can also be seen that a connection 28 is provided between the conductor 21 and the wire 23.

A current supply line A, B extends to a switch unit generally referred to by numeral 29 and from this switch unit 29 a series connection 30, 31 is established with a second switch unit generally referred to by numeral 32, and from opposite sides of the switch unit 32, wires 33, 34 extend to the conductor strip 18 and 20, respectively, the wire 33 being also connected as at 35 to the conductor strip 21.

It can be seen that when the switch units 29, 32 are closed, and an animal attempts to go down the chute 17, in bridging certain of the strips 18, 19, 20 and 21, a circuit will be established with the current supply line A, B, charging the animal's body and electrocuting the creature.

The end wall 9 of the trap has an opening 36 through which is disposed a drawer 37 for catching electrocuted animals. The partition 10 has an opening 38 in the lower portion thereof for receiving a slide 39 against which the drawer 37 can act, in actuating the switch unit 29, which will be known as the horizontal switch.

The bottom 5 of the trap has an opening 40 therein for receiving a slide 41, this slide forming part of the vertical switch unit generally referred to by numeral 32.

The switch unit 29 has its slide 39 slidable through a guide 42, this guide 42 having a socket 43 in the upper portion thereof. Projecting into the socket 43 and interposed between the back wall thereof and a lug 44 on the slide 39 is a coiled compression spring 45.

The outer end of the slide 39 carries a pair of prongs 46 which are engageable with spring contact fingers 47 located on a block 48 held in place by a clamp 49 secured to the trap bottom 5.

Obviously, when the drawer 37 is open, the slide 39 is forced to the left in Figure 4 by the spring 45, thus disconnecting the prongs 46 and fingers 47 so that current cannot pass through the conductor strips 18, 19, 20 and 21, thus minimizing the chance of the attendant being subjected to an electric shock.

This safeguard also prevails when the trap is being lifted for a shift to another location without the removal of the usual cable or conductor cord, in that the slide 41 is forced downwardly by a spring 50 which is interposed between a lug 51 on the slide 41 and the back wall of a socket 52 which is located on a guide 53 through which the slide 41 is movable.

Figure 9:
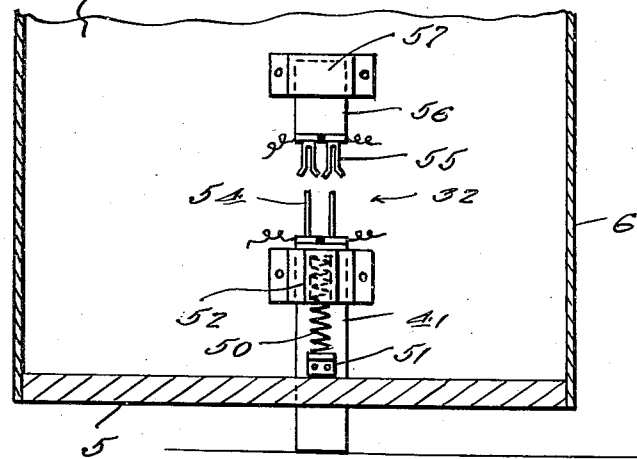
Figure 9 is a fragmentary sectional view similar to that of Figure 8, but showing the trap lifted and the vertical switch broken.

The upper end of the slide 41 has contact prongs 54 which are engageable with contact fingers 55, the latter being located on a block 56 held in place by a clamp 57. Circuit wires 54a and 55a are connected respectively to the contact prongs 54 and contact fingers 55. When the trap is lifted, the spring 50 forces the slide 41 downwardly, breaking the connection between the prongs 54 and the spring fingers 55, regardless of the position of the drawer 37. The slide 41 moves down to the position substantially shown in Figure 9. Thus the chance of an attendant being shocked is minimized.

The lamp 25 serves to indicate when energized that the trap is in working order.

A suitable conductor cord having a plug may be attached to the connector 58 on the end wall 8 of the trap.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A trap of the character described comprising a box-like structure having an animal entrance, animal-electrocuting means in the structure adapted to electrocute an animal entering the structure, a drawer arranged to receive the electrocuted animal, switch means connected in series with the electrocuting means in the structure in the path of movement of the drawer to move the switch into its closed position when the drawer is placed in a substantially closed position in the structure, and spring means moving the switch into its open position when the drawer is removed.

2. A trap of the character described comprising a box-like member having an animal entrance, animal-electrocuting means in the member adapted to electrocute an animal entering the member, switch means carried by the member for the electrocuting means, and switch-actuating means projecting from the bottom of the member and operable to close the switch when the member is placed in a position at rest on a structure for supporting the member.

3. A trap of the character described comprising a box-like structure having an animal entrance, animal-electrocuting means in the structure adapted to electrocute an animal entering the structure, a spring-projected member in the bottom of the structure and projecting therefrom when the structure is raised above the ground, and a switch for the electrocuting means and operable by the member for movement into closed position by contact of the member with the ground.

PAUL MEEHAN.